(12) United States Patent
Heacock (10) Patent No.: US 12,005,865 B2
(45) Date of Patent: Jun. 11, 2024

(54) ACCESSORY MOUNT FOR VEHICLES

(71) Applicant: Glen Heacock, Sellersburg, IN (US)

(72) Inventor: Glen Heacock, Sellersburg, IN (US)

( * ) Notice: Subject to any disclaimer, the term of this patent is extended or adjusted under 35 U.S.C. 154(b) by 158 days.

(21) Appl. No.: 17/931,737

(22) Filed: Sep. 13, 2022

(65) Prior Publication Data
US 2023/0091144 A1  Mar. 23, 2023

Related U.S. Application Data

(60) Provisional application No. 63/371,267, filed on Aug. 12, 2022, provisional application No. 63/245,514, filed on Sep. 17, 2021.

(51) Int. Cl.
*B60R 9/06* (2006.01)

(52) U.S. Cl.
CPC ....................... *B60R 9/06* (2013.01)

(58) Field of Classification Search
CPC ........................................... B60R 9/06
USPC ........................................ 224/42.13
See application file for complete search history.

(56) References Cited

U.S. PATENT DOCUMENTS

| | | | | |
|---|---|---|---|---|
| 1,780,044 A * | 10/1930 | Scholl | .................... | B62D 43/02 224/511 |
| 2,813,671 A * | 11/1957 | Gill | ......................... | B60R 11/00 224/570 |
| 2,951,671 A * | 9/1960 | Frederick | ................ | B60R 11/00 224/42.13 |
| 3,349,977 A * | 10/1967 | Caminiti | ................ | B62D 43/02 224/330 |
| 3,972,457 A * | 8/1976 | Kesler | ...................... | B60R 9/12 224/511 |
| 4,392,597 A * | 7/1983 | Traugh | ..................... | B60R 9/10 224/511 |
| 4,911,343 A * | 3/1990 | Lords | ...................... | B60R 11/00 224/511 |
| 5,007,567 A * | 4/1991 | Foster | ...................... | B60R 9/10 224/535 |
| 5,085,360 A * | 2/1992 | Fortune | .................... | B60R 9/10 224/42.21 |
| 5,203,479 A * | 4/1993 | Lucas | ...................... | B60R 9/06 296/37.6 |
| 5,228,608 A * | 7/1993 | Stout, III | ............. | B62D 43/005 D12/202 |
| 5,558,261 A * | 9/1996 | Hedeen | .................... | B60R 9/10 224/511 |

(Continued)

FOREIGN PATENT DOCUMENTS

| | | | | |
|---|---|---|---|---|
| GB | 2275240 A | * | 8/1994 | ............... B60R 9/06 |
| JP | 06055979 A | * | 3/1994 | |

*Primary Examiner* — Justin M Larson (57) ABSTRACT

A collapsible accessory mount provides a secure way to attach accessories, such as a flag, banner, light, loudspeaker, camera, basket or other such device, to an automobile using an external spare tire as a mounting point. The external spare provides solid mounting surface for attaching a collapsible accessory mount without interfering with access to the trunk or rear hatch of the vehicle, and may be installed and removed without making permanent modifications to the vehicle frame or chassis. A collapsible accessory mount includes a central bracket and a plurality of arms, each arm configured to extend beyond the radius of the automobile tire, where each of said arms may be releasably attached to the tire using tire connectors.

20 Claims, 8 Drawing Sheets

(56) References Cited

U.S. PATENT DOCUMENTS

| | | | |
|---|---|---|---|
| 10,384,618 B2* | 8/2019 | Williams | B60R 9/10 |
| 10,493,924 B2* | 12/2019 | Samouce | B60R 9/06 |
| 10,625,685 B1* | 4/2020 | Gruener | B60R 19/38 |
| 10,894,514 B2* | 1/2021 | Williams | B60R 9/10 |
| 11,752,949 B2* | 9/2023 | Wood | B60R 11/00 224/42.13 |
| 11,794,659 B1* | 10/2023 | Sullivan | B60R 9/06 |
| 11,849,821 B2* | 12/2023 | Tai | A45B 11/00 |
| 2006/0032874 A1* | 2/2006 | Pansewicz | B60R 9/06 224/42.13 |
| 2023/0091144 A1* | 3/2023 | Heacock | B62D 43/02 224/42.26 |
| 2024/0051471 A1* | 2/2024 | Heacock | B62B 3/02 |

\* cited by examiner

ACCESSORY MOUNT FOR VEHICLES

CROSS-REFERENCE TO RELATED APPLICATIONS

This application claims priority from U.S. Provisional Application No. 63/245,514 filed on Sep. 17, 2021, the full disclosure of which is hereby incorporated by reference. This application also claims priority from U.S. Provisional Application No. 63/371,267 filed on Aug. 12, 2022, the full disclosure of which is hereby incorporated by reference.

BACKGROUND

The present disclosure relates to collapsible, adjustable accessory mounting devices configured to attach to the external spare tire of an automobile, and methods for using the same.

It has long been desirable for automobile owners, particularly owners of sport utility vehicles, recreational vehicles and jeep-style vehicles, to add rear-mounted accessories to their vehicles for purposes such as the storage and transport of coolers, containers, bicycles, and other items that the automobile owner cannot or may not want to transport in the interior of the vehicle. However, traditional methods of mounting such accessories to a vehicle have several drawbacks.

For example, some conventional methods of mounting accessories on a vehicle are configured to attach to a vehicle's trailer hitch. These methods provide a secure attachment between the vehicle and the accessory or accessory mounting system. But, because such methods utilize the trailer hitch, they cannot be used if the trailer hitch is needed for some other purpose, or on vehicles lacking a hitch. Moreover, this style of accessory mount typically blocks access to the vehicle's truck or rear door, and must be manipulated out of the way or removed from the vehicle entirely in order to access the rear of the vehicle.

Other methods of mounting accessories to a vehicle exist that rely on affixing the accessory mount to another portion of the vehicle, such as a portion of a pick-up truck's bed or frame. Depending on the location of the mount, these methods may also interfere with the operation of the trunk or rear door of the vehicle. And, these methods may require irreversible modifications be made to the vehicle, such as by drilling holes or installing permanent brackets.

On certain vehicles having an external tire carrier or rear tire frame, such as the Jeep Wrangler®, it may be possible to affix a mounting bracket for an accessory on the external tire itself. However, traditional mounting brackets that utilize a vehicles rear tire tend to be at least as large as the tire itself, making it difficult to transport and store such brackets when not in use. And, such devices must generally be made to fit a particular size of tire, limiting the number of vehicles with which a particular mounting bracket may be compatible.

A need therefore exists for a vehicle accessory mount configured to attach to the external spare tire of an automobile, that is collapsible for storage, and adjustable for use with tires of varying sizes and models.

SUMMARY

This disclosure is directed to collapsible accessory mounts for vehicles, automobile tires having collapsible accessory mounts, and methods for using the same.

In one embodiment, a collapsible accessory mount is disclosed comprising a central bracket an inner surface and an outer surface, a first arm having a proximal end and a distal end that is rotatably attached to the outer surface of the central bracket at the proximal end, and having a first tire connector at the distal end, a second arm having a proximal end and a distal end, that is rotatably attached to the outer surface of the central bracket at the proximal end, and having a second tire connector at the distal end, a third arm having a proximal end and a distal end, that is rotatably attached to the outer surface of the central bracket at the proximal end, and having a third tire connector at the distal end, and an accessory mount disposed on the outer surface of the central bracket. The first arm, second arm and third arm may be rotatable between a deployed position and a not deployed position. When in the deployed position, the collapsible accessory mount may be attached to an automobile tire at the first tire connector and second tire connector. The length of the arms may be variable, and for example may be expanded or contracted by between 1 and 10 inches. The arms may further include a ball catch configured to releasably fix the length of the telescoping arms. And the central bracket may further include latches to secure the arms in a deployed position.

This disclosure is also directed to automobile tires having accessory mounts. In this embodiment, an automobile tire having a collapsible accessory mount includes an automobile tire, a collapsible accessory mount that includes a central bracket having an inner surface and an outer surface, a first arm having a proximal end and a distal end that is rotatably attached to the outer surface of the central bracket at the proximal end, and having a first tire connector at the distal end, a second arm having a proximal end and a distal end, that rotatably attached to the outer surface of the central bracket at the proximal end, and having a second tire connector at the distal end, a third arm having a proximal end and a distal end, that is rotatably attached to the outer surface of the central bracket at the proximal end, and having a third tire connector at the distal end, and an accessory mount disposed on the outer surface of the central bracket. The collapsible accessory mount may be releasably attached to the automobile tire at the first tire connector the second tire connector and the third tire connector. The length of the arms may be variable, and for example may be expanded or contracted by between 1 and 10 inches. The telescoping arms may further include a ball catch configured to releasably fix the length of the arms. And the central bracket may further include latches to secure the arms in a deployed position.

This disclosure is also directed to a method of installing a collapsible accessory mount on an automobile tire. The method includes providing a collapsible accessory mount including a central bracket having an inner surface and an outer surface, a first arm having a proximal end and a distal end, said first arm rotatably attached to the outer surface of the central bracket at the proximal end and having a first tire connector at the distal end, a second arm having a proximal end and a distal end, said second arm rotatably attached to the outer surface of the central bracket at the proximal end and having a second tire connector at the distal end, a third arm having a proximal end and a distal end, said third arm rotatably attached to the outer surface of the central bracket at the proximal end, and a primary attachment point disposed on the outer surface of the central bracket, wherein the first telescoping arm, second telescoping arm and third telescoping arm are rotatable between a deployed position and a not deployed position. According to said method, the arms may be rotated about hinges until deployed locking points on the central bracket are aligned with a corresponding locking mechanism on the arms. The arms may then be extended by sliding an inner member laterally relative to a sleeve until a telescoping latch aligns with a perforation on the sleeve. Then, secondary arms may be rotated about an elbow into a deployed position. Finally, the collapsible accessory mount is placed on a vehicle tire and secured to the tire with tire connectors.

The collapsible accessory mounts, automobile tires having collapsible accessory mounts, and methods for using the same may also include additional features. The accessory mount may include an accessory mount latch for releasably attaching an accessory. The accessory mount may also include a flagpole configured to attach a flag or banner. Additionally, the accessory mount may be configured to attach an adapter configured to support multiple accessories, and may have two or more accessory mount latches.

DETAILED DESCRIPTION

This disclosure is not limited in its application to the details of construction and the arrangement of components set forth in the following description or illustrated in the drawings. The disclosure is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Figure 1:
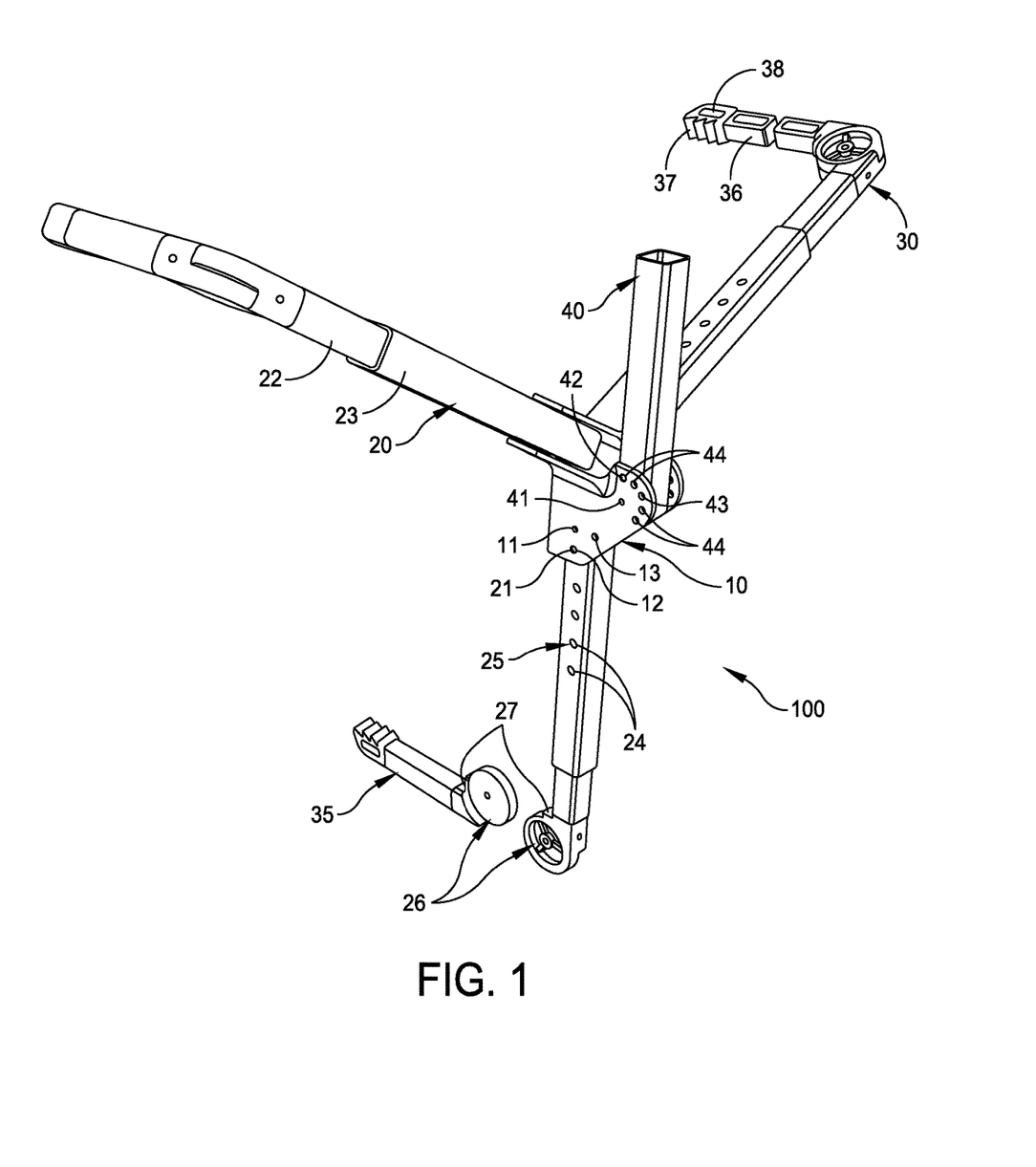
FIG. 1 is a perspective view of a collapsible accessory mount.

Referring to FIG. 1, a collapsible accessory mount 100 may include a central bracket 10, configured to attach arms 20, and accessory mount 40. Central bracket 10 may be constructed of a durable material capable of withstanding significant twisting and sheer forces while also remaining weather resistant. Such materials may include galvanized steel, stainless steel, or aluminum. According to one embodiment, central bracket 10 is configured to attach three arms 20, evenly spaced approximately 120° from one another. According to another embodiment, central bracket 10 may be configured to attach four arms 20, spaced approximately 90° from one another. Central bracket 10 may be configured to attach as few as two arms 20, or more than four arms 20, without departing from the spirit of this disclosure.

Each arm 20 is attached at its proximal end to central bracket 10 via a hinge 11. In some embodiments, hinge 11 may be a spring-loaded hinge configured maintain arms 20 in a storage position, in which each arm 20 is rotated into adjacent proximity to one another, unless acted upon by an external force. In other embodiments, hinge 11 may be a spring loaded hinge configured to maintain arms 20 in a deployed position, in which each arm 20 is extended radially away from one another, unless acted upon by an external force. In still other embodiments, hinge 11 is not spring loaded, and arms 20 may be permitted to move freely between a deployed position and a storage position, unless fixed using a mechanical fastener.

For each arm 20, central bracket 10 may also include a deployed locking point 12 and a storage locking point 13. According to some embodiments, deployed locking point 12 and storage locking point 13 are configured to align with a corresponding locking mechanism 21 on arm 20 when said telescoping arm 20 is in a deployed position or a storage position, respectively. According to one embodiment, deployed locking point 12, storage locking point 13 and corresponding locking mechanism 21 are in the form of holes sized to accommodate a pin or bar. When arm 20 is in the deployed position, said pin may be inserted through deployed locking point 12 and corresponding locking mechanism 21, preventing arm 20 from rotating about hinge 11 and thereby locking arm 20 in the deployed position. When arm 20 is in the storage position, said pin may be inserted through storage locking point and corresponding locking mechanism, preventing said telescoping arm 20, locking telescoping arm 20 in the storage position.

Other methods of affixing arm 20 in the storage position may be used without departing from the spirit of this disclosure. For example, corresponding locking mechanism 21 may be in the form of a spring-loaded ball catch, and deployed locking point 12 and storage locking point 13 may be holes sized to accommodate said ball catch. In this configuration, the ball catch of corresponding locking mechanism 21 may be depressed to rotate arm 20 from the storage position to deployed position, or vice versa. When the ball catch of corresponding locking mechanism 21 aligns with the hole of either deployed locking point 12 or storage locking point 13, spring force causes the ball catch to protrude through said locking mechanism, securing arm 20 in a fixed position.

Arm 20 may be a telescoping arm constructed of a sleeve 23, having a hollow interior such that an inner member 22 may be slidably inserted therein. Sleeve 23 may further comprise perforations 24 spaced at regular intervals along the length of sleeve 23. Perforations 24 are configured to align with a telescoping latch 25 disposed on inner member 22. According to one embodiment, telescoping latch 25 is a spring-loaded ball catch. Spring force may cause the ball catch of telescoping latch 25 to protrude through one set of perforations 24, preventing inner member from moving relative to the length of sleeve 23. When the ball catch of telescoping latch 25 is manually depressed, the length of arm 20 may be increased or decreased by moving inner member 22 relative to sleeve 23, until telescoping latch 25 aligns with another perforation 24. Alternatively, telescoping latch 25 may be in the form of a pin or pole extending through perforation 24 and telescoping latch 25, preventing lateral motion of inner member 22 relative to sleeve 23.

Inner member 22 and sleeve 23 may be constructed of a durable and weather resistant material, such as aluminum, galvanized steel, stainless steel, carbon fiber or fiberglass. According to one embodiment, inner member 22 and sleeve 23 may be constructed of square tube stock aluminum. According to another embodiment, inner member 22 and sleeve 23 may be constructed of round tube stock. In other embodiments, inner member 22 may be constructed of solid material.

When fully extended by sliding inner member 22 until telescoping latch 25 aligns with the most distal perforation 24 of sleeve 23, telescoping arm 20 may be lengthened to accommodate a tire of any size found in conventional consumer automobiles. For example, on vehicles that can accommodate tires of 30 to 40 inches in diameter, arm 20 may be extensible to at least the radius of said tire, or from 15 to 20 inches.

According to other embodiments, arm 20 may have a fixed length corresponding to a specific radius of tire.

An elbow, 30 may be attached at its proximal end to each of the distal ends of arms 20. According to some embodiments, elbow 30 may be comprised of two circular members 26 that may be rotatably coupled to one another, such as by a pin or bar. Circular member 26 may be constructed with stops 27, that allow elbow 30 to rotate 90° between a deployed position and a storage position, but prevent elbow 30 from over rotating. According to some embodiments, elbow 30 may be comprised of two circular members 26 rotatably attached 180° from one another, thus reducing the number of distinct parts that are required for construction. Circular members 30 may be constructed of cast material, including ABS plastic, aluminum, or steel, or may be a machined part. According to other embodiments, elbow 30 may alternatively be constructed of a pinned hinge, an L-bracket, or other method of attachment known in the art.

A secondary arm 35 may be connected at its proximal end to each of the distal ends of elbows 30. In its deployed position, secondary arm 35 may be configured to contact the exterior surface of a vehicle tire on its outer tread surface via a tire connector 36. Tire connector 36 may comprise a gripping portion 37, configured to make a high-friction contact with the tire surface, as well as a loop 38 configured to allow a high tensile strength strap, cable, band or hook to be passed through. According to one embodiment, a strap, cable or band may be passed through each of the plurality of loops and tightened about the circumference of the tire. According to other embodiments, the high tensile cable, strap, or band that can be secured to the body of an automobile tire, to another loop 38 disposed on a separate arm, or a suitable location on the vehicle's tire, frame or chassis.

Primary attachment point 40 may be located on the exterior surface of central bracket 10, and connected to central bracket 10 via attachment point hinge 41. In one embodiment, primary attachment point 40 is configured to support a flagpole and flag, such as the American flag, or other sort of banner or symbol that a vehicle owner may wish to display as a show of patriotism, or belief. However, primary attachment point 40 may alternatively support a variety of attachments, including poles, hooks, baskets, or other accessories, without departing from the spirit of this disclosure. Primary attachment point 40 may be configured to be placed in a storage position, in which primary attachment point 40 extends perpendicular to the exterior surface of central bracket 10, and is secured at storage point 43 via primary attachment point locking mechanism 42. According to some embodiments, primary attachment point locking mechanism 42 may be a ball catch configured to align with a hole or slot at storage point 43. Alternatively, primary attachment point locking mechanism 42 may be a pin or bar. Additional locking mechanisms may be used to secure primary attachment point 40 in a fixed position without departing from the spirit of this disclosure.

Central bracket 10 may also include one or more deployment points 44 in the form of a hole or slot configured to align with primary attachment point locking mechanism 42, for when primary attachment point 40 is to be placed in a deployed position. According to one embodiment, central bracket 10 includes two deployment points, configured to lock primary attachment point 40 in a position at 45° relative to the vertical position of primary attachment point 40 in the storage position, or 90° relative to the vertical position of primary attachment point 40 in the storage position. In use, this would allow a flag, pole, banner, or other accessory device to be mounted to tire attachment 10 in either a vertical position, or in an inclined position projecting at an angle away from the rear of the vehicle. In other embodiments, central bracket 10 may include one deployment point 44 at any angle between 0 and 90° relative to the vertical position of primary attachment point 40 in the storage position, or more than two deployment points 44 at any such angles. Alternatively, central bracket 10 can be configured with deployment points 44 allowing for a full 180° range of motion. For example, central bracket may include 5 deployment points 44, at 0° relative to the vertical position of tire mount accessory 45°, 90°, 135° and 180°. Primary attachment point 40 may also be constructed of a durable and weather resistant material, such as aluminum, galvanized steel, stainless steel, carbon fiber or fiberglass. In one embodiment, primary attachment point 40 is constructed of square tube stock aluminum. According to another embodiment, primary attachment point 40 is constructed of round tube steel.

Figure 2:
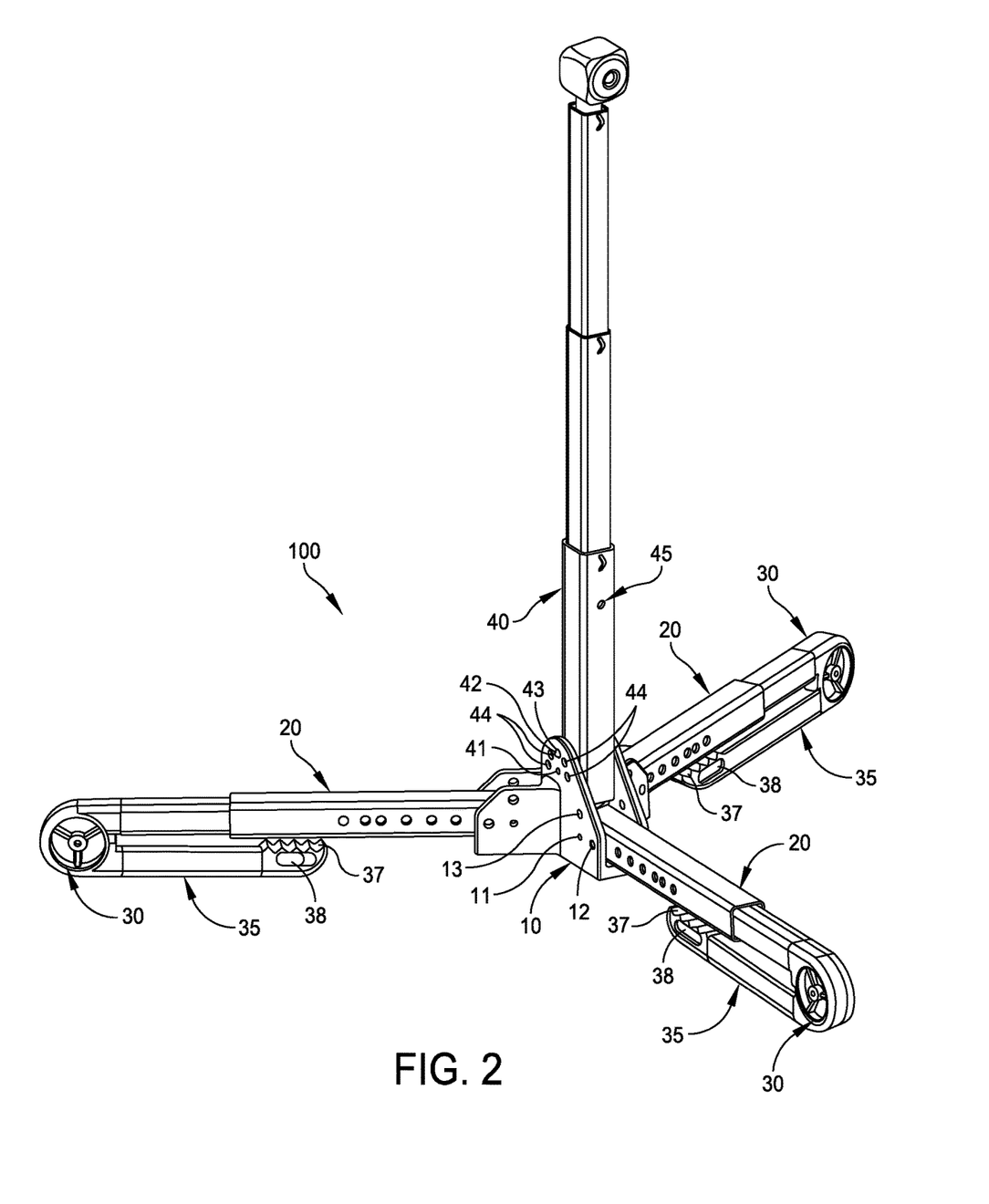
FIG. 2 is a top perspective view of a collapsible accessory mount.

Referring to FIG. 2, primary attachment point 40 may also include an accessory latch 45 for affixing an accessory, such as a flag, banner, light, loudspeaker, camera, basket or other such device. Accessory latch 45 may be in the form of a ball catch or pin. Alternatively, accessory latch 45 may accommodate any number of methods of affixing an accessory known in the art, including a threaded connector, a friction connection, clamps, set screws, pins, or a ball catch. Additional methods of affixing an accessory to primary attachment point 40 may be used without departing from the spirit of this disclosure.

Collapsible accessory mount 100 may also be used apart from a vehicle tire, such as in the configuration shown. With arms 20 extended in the deployed position, Collapsible accessory mount 100 can be placed on the ground as a vertical stand, or according to some embodiments, a tripod. Primary attachment point 40 may then be fixed in the 90° position, allowing attachments to be mounted vertically on the stand. Such attachments could include a flag, a pole, light, a portable loudspeaker, a camera, or other such devices.

Figure 3:
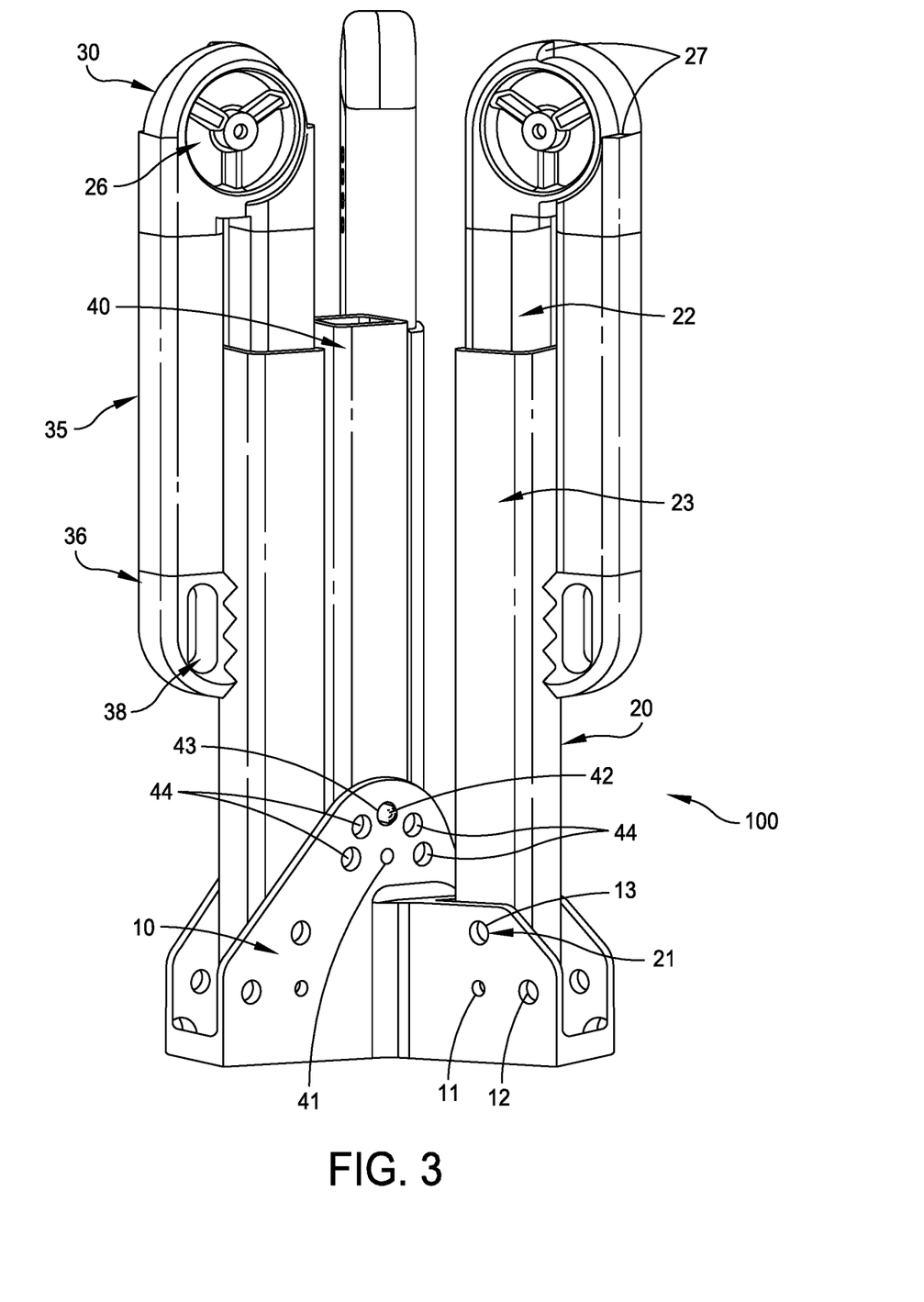
FIG. 3 is a perspective view of a collapsible accessory mount.

Referring to FIG. 3, a collapsible accessory mount 100 is shown with all joints oriented in a storage position. In this orientation, primary attachment point 40 projects substantially perpendicular to the external surface of central bracket 10. Each of the arms 20 are oriented substantially parallel to primary attachment point 40, and secondary arms 35 are oriented parallel to arms 20. In this orientation, collapsible accessory mount 100 may be compactly stored when not in use.

Figure 4:
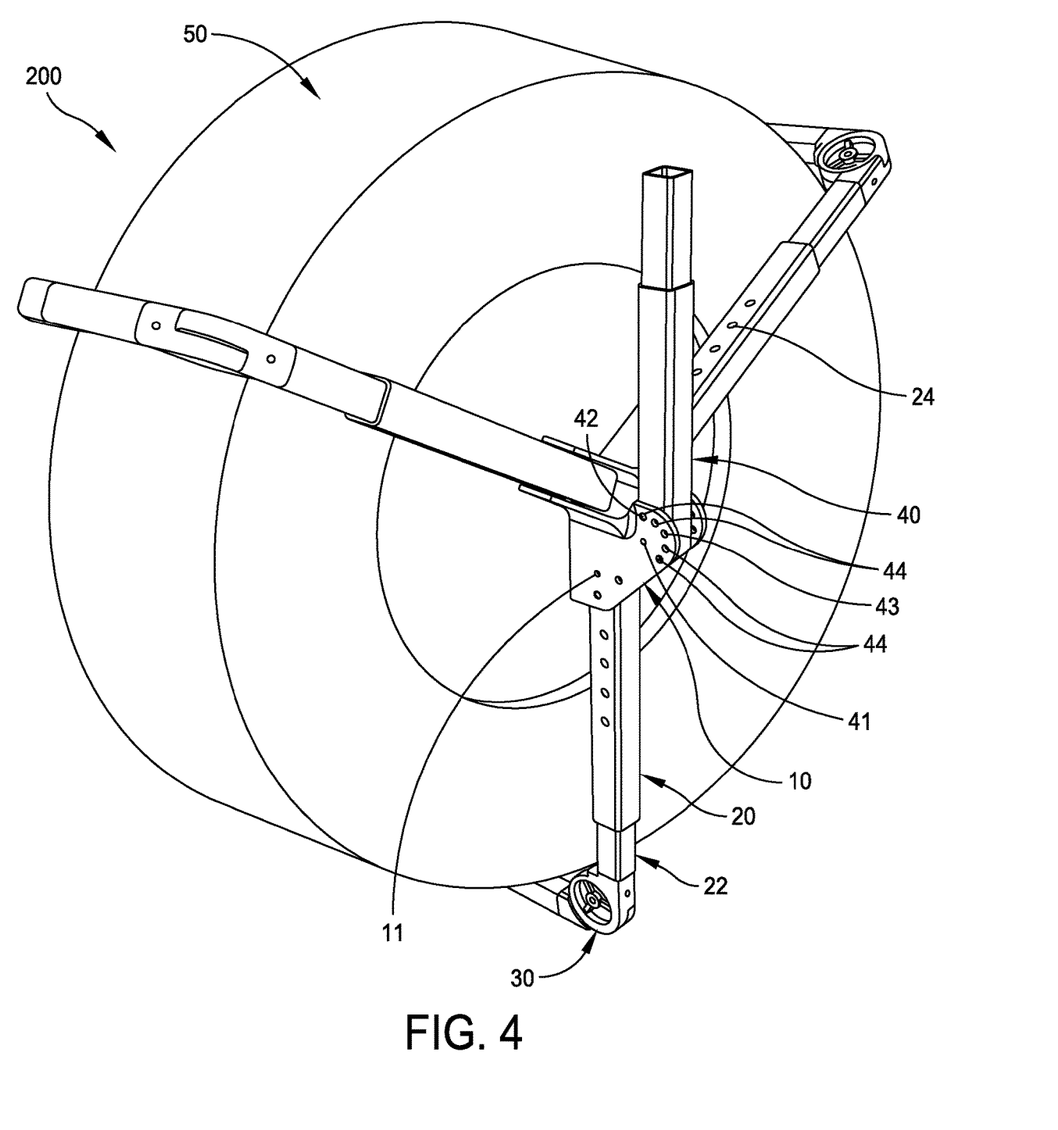
FIG. 4 is a perspective view of an automobile tire having a collapsible accessory mount.

Referring to FIG. 4 an automobile tire having a collapsible accessory mount 200 may include a collapsible accessory mount 100 and an automobile tire 50. Automobile tire 50 may be a conventional spare tire configured to mount externally on the rear hatch or door of a vehicle. According to some embodiments, automobile tire 50 may be between 30 and 40 inches in diameter. However, embodiments of the present disclosure may be compatible with tires of varying sizes.

Figure 5A:
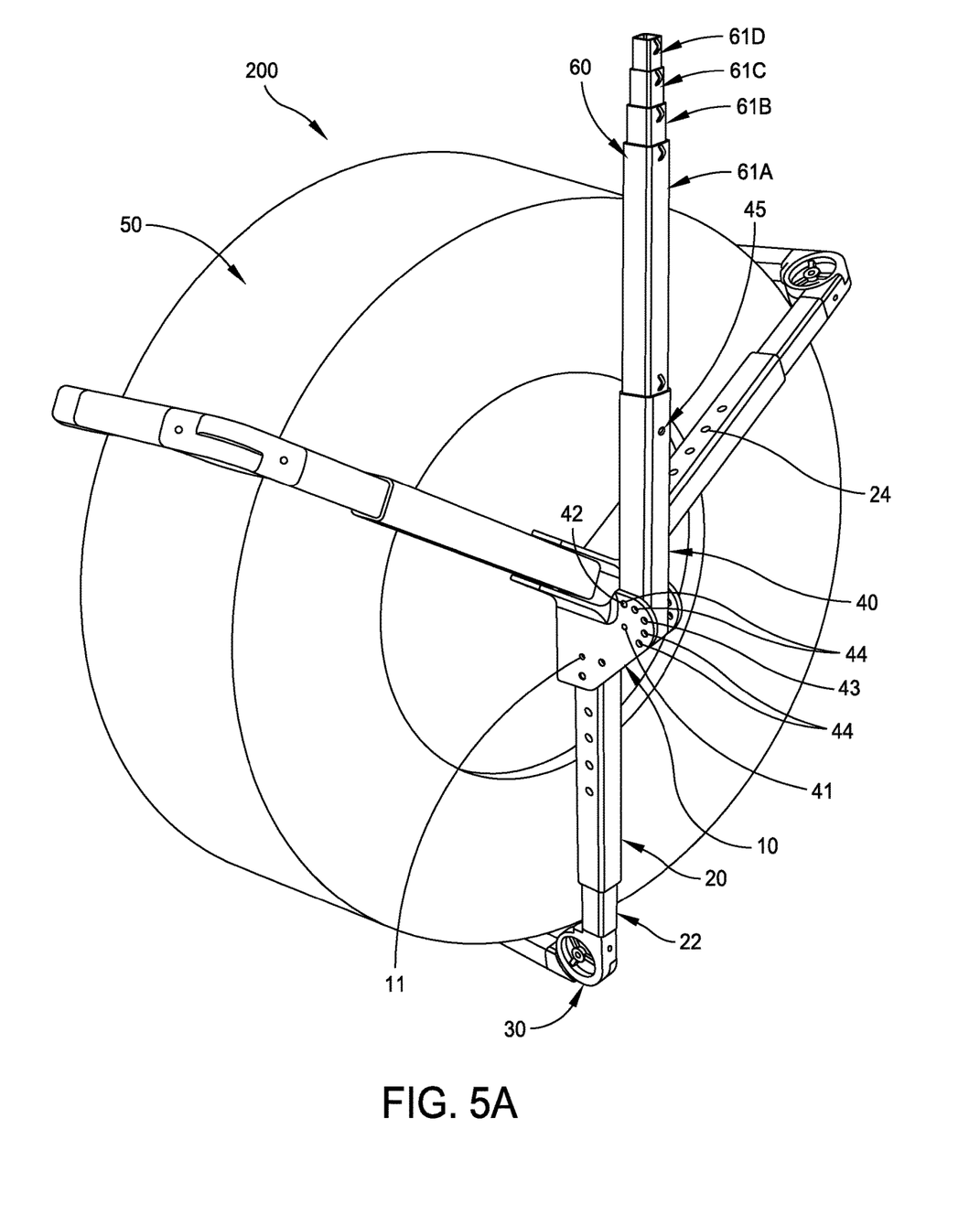
FIG. 5A is a perspective view of an automobile tire having a collapsible accessory mount that includes a flagpole.
Figure 5B:
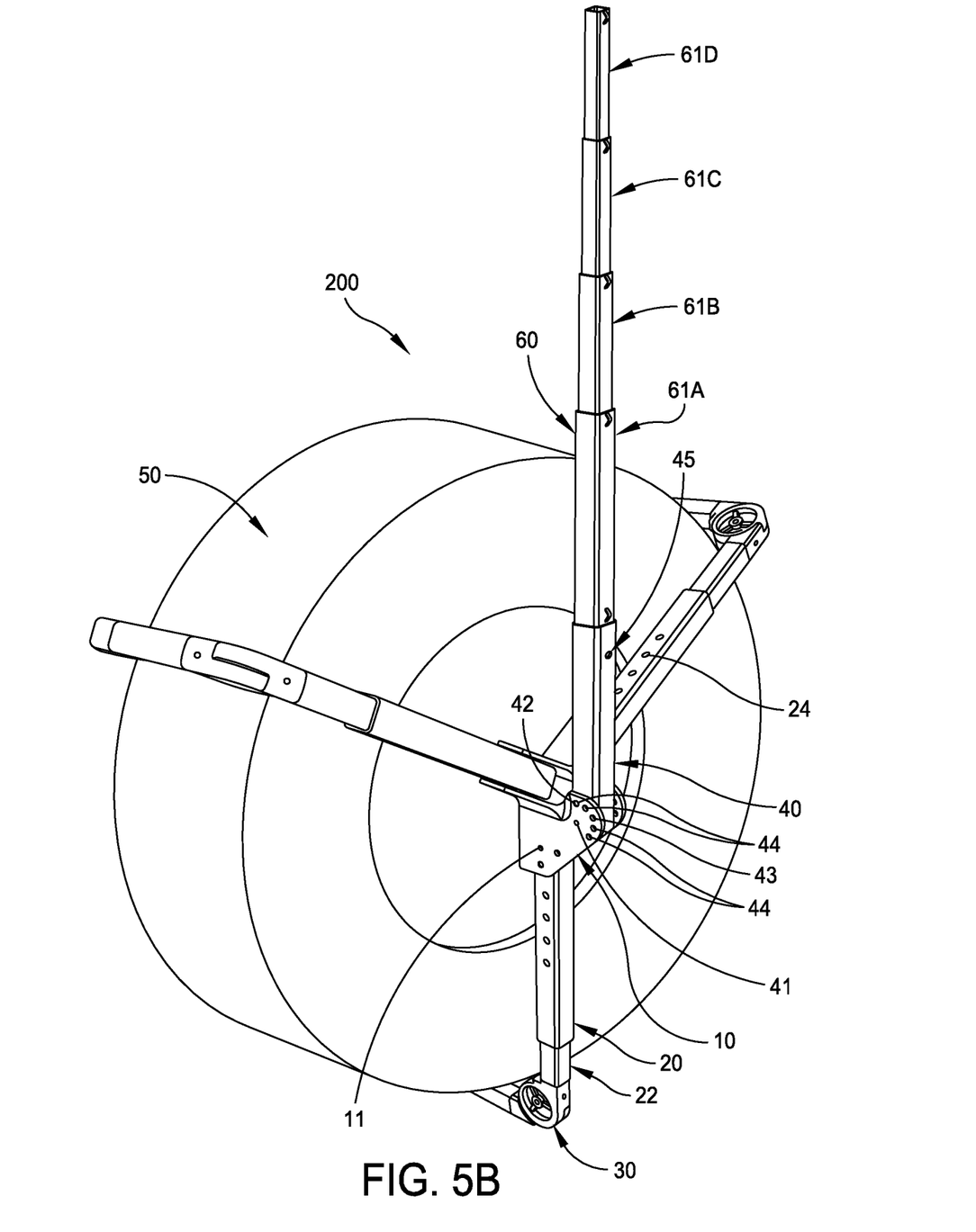
FIG. 5B is a perspective view of an automobile tire having a collapsible accessory mount that includes a flagpole.

Referring to FIGS. 5A and 5B, an automobile tire having collapsible accessory mount 200 may also include a flagpole 60. According to one embodiment, flagpole 60 is a telescoping flagpole constructed of square tube stock aluminum in four sections, telescoping section 61A, 61B, 61C, and 61D. Telescoping may be accomplished because the inner diameter of section 61A is larger than the outer diameter of section 61B, which has an inner diameter that is larger than the outer diameter of 61C, which also has an inner diameter that is larger than the outer diameter of 61D. Fewer or a greater number of telescoping sections may be employed without departing from the spirit of the disclosure. In an example embodiment having four sections 61A, 61B, 61C, and 61D, flagpole 60 may be extensible to approximately four times its collapsed length. According to one embodiment, flagpole 60 may be extensible to roughly 4 feet, although flagpole 60 may be as little as 1 foot length, or as long as 6 feet. In another embodiment, flagpole 60 may be constructed of a single piece of material, such as fiberglass, carbon fiber or PVC plastic. Flagpole 60 may be configured to attach to primary attachment point 40 and be secured to the mount by accessory latch 45.

Figure 6:
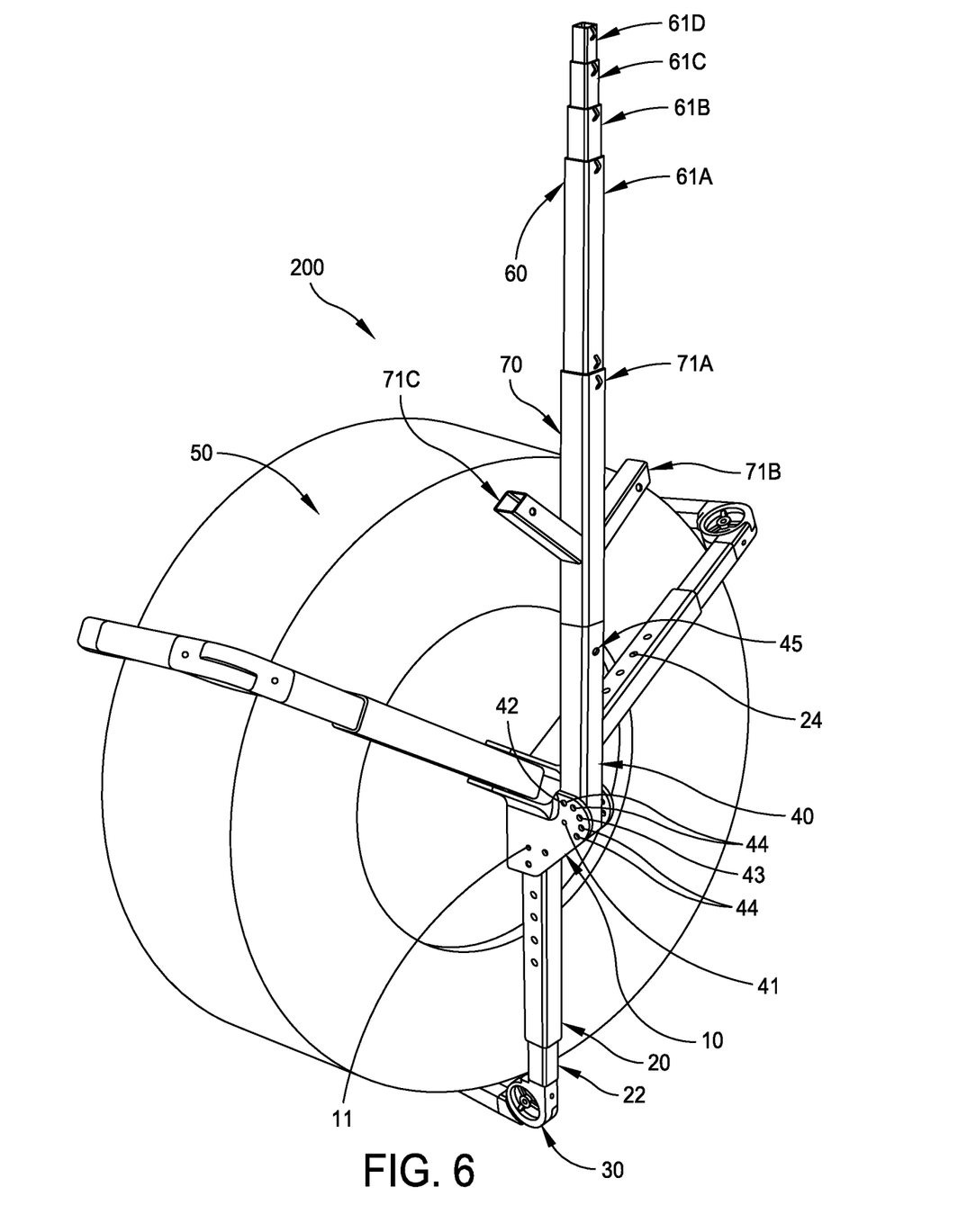
FIG. 6 is a perspective view of an automobile tire having a collapsible accessory mount that includes a multi-accessory adapter and a flagpole.

Referring to FIG. 6, an automobile tire having a collapsible accessory mount 200 may also include a multi-accessory adapter 70. At a proximal end, multi-accessory adapter 70 may be configured to attach to accessory latch 45. At its distal end, multi-accessory adapter 70 may have a plurality of adapter flag latches 71A, 71B and 71C. Adapter latches 71A, 71B and 71C may be sized and have the same attachment mechanism as accessory latch 45, so that multi-accessory adapter 70 may be compatible with any accessory that can be affixed to primary attachment point 40. In the example configuration, multi-accessory adapter 70 is configured to attach 3 accessories, such as flags, banners, lights, loudspeakers, cameras, basket or flagpoles 60 with adapter latch 71A oriented vertically, and 71B and 71C disposed at an angle from adapter latch 71A. In other embodiments, multi-accessory adapter 70 may be configured to attach as few as two accessories or as many as six accessories.

Figure 7:
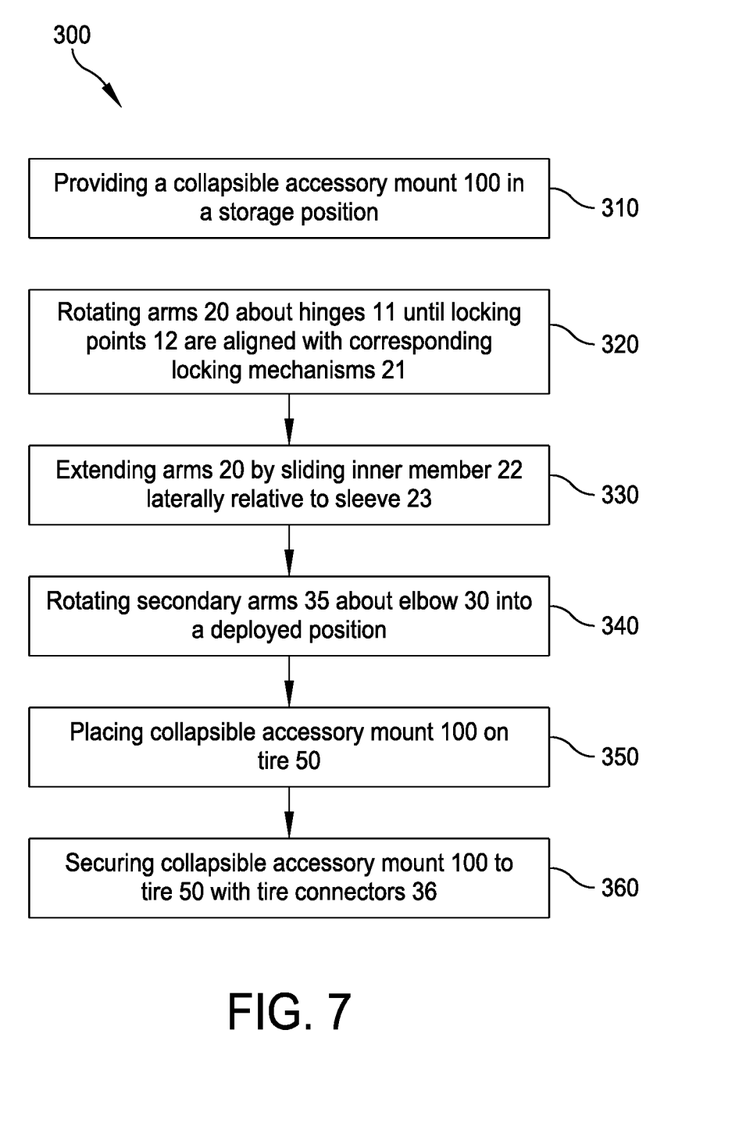
FIG. 7 is a flowchart of the usage.

Referring to FIG. 7, a method 300 of attaching a collapsible accessory mount 100 to an automobile tire 50 is described. In step 310 a collapsible accessory mount 100 is provided in a storage position including a central bracket 10 comprised of a deployed locking point 12, arms 20, comprised of a corresponding locking mechanism 21, an inner member 22 slidably inserted into a sleeve 23, and attached to a central bracket 10 via hinges 11, with an elbow 30 disposed at the distal end of arms 20 comprised of two circular members 26, with secondary arms 35 connected at the opposite end thereof, and a tire connector 36 attached thereto. In step 320, arms 20 are rotated about hinges 11 until deployed locking points 12 on central bracket 10 are aligned with corresponding locking mechanisms 21 on arms 20. In step 330, arm 20 is extended by sliding inner member 22 laterally relative to sleeve 23 until telescoping latch 25 aligns with a perforation 24 of sleeve 23. In step 340, secondary arms 35 are rotated about elbow 30 into a deployed position. In step 350 collapsible accessory mount 100 is placed on the tire 50. In step 360, collapsible accessory mount 100 is secured to tire 50 with tire connectors 36.

Having now described some illustrative embodiments, it is apparent that the foregoing is illustrative and not limiting, having been presented by way of example. In particular, although many of the examples presented herein involve specific combinations of elements, those elements may be combined in other combinations. Elements and features discussed only in connection with one embodiment are not intended to be excluded from other embodiments.

Any references to front and back, left and right, top and bottom, or upper and lower and the like are intended for convenience of description, not to limit the present systems and methods or their components to any one positional or spatial orientation.

Any references to embodiments or elements herein referred to in the singular may also embrace embodiments including a plurality of these elements, and any references in plural to any embodiment or element herein may also embrace embodiments including only a single element. References in the singular or plural form are not intended to limit the presently disclosed components or elements to single or plural configurations.

Any embodiment disclosed herein may be combined with any other embodiment, and references to "an embodiment," "some embodiments," "an alternate embodiment," "various embodiments," "one embodiment" or the like are not necessarily mutually exclusive and are intended to indicate that a particular feature or characteristic described in connection with the embodiment may be included in at least one embodiment. Such terms as used herein are not necessarily all referring to the same embodiment. Any embodiment may be combined with any other embodiment, inclusively or exclusively, in any manner consistent with the aspects and embodiments disclosed herein.

What is claimed is:

1. A collapsible automobile accessory mount comprising:
   a central bracket having an inner surface and an outer surface,
   a first arm having a proximal end and a distal end, said first arm rotatably attached to the central bracket at the proximal end, and having a first tire connector rotatably attached to the distal end;
   a second arm having a proximal end and a distal end, said second arm rotatably attached to the central bracket at the proximal end, and having a second tire connector rotatably attached to the distal end;
   a third arm having a proximal end and a distal end, said third arm rotatably attached to the central bracket at the proximal end;
   an accessory attachment point disposed on the outer surface of the central bracket;
   wherein the first arm, second arm and third arm are rotatable between a deployed position and a not-deployed position; and
   wherein when the arms are in the deployed position, the collapsible automobile accessory mount may be attached to an automobile tire at the first tire connector and second tire connector.

2. The collapsible automobile accessory mount of claim 1, wherein the lengths of the first arm, second arm and third arm are extensible by between 1 and 10 inches.

3. The collapsible automobile accessory mount of claim 1, wherein the first arm further includes a ball catch configured to fix the first arm's position at or between the deployed position and the non-deployed position.

4. The collapsible automobile accessory mount of claim 1, wherein the central bracket further comprises a plurality of stops configured to releasably fix the rotation of the first arm, the second arm, and the third arm in a preset position.

5. The collapsible automobile accessory mount of claim 1, wherein the accessory attachment point further includes an accessory attachment point connector for releasably attaching an accessory.

6. The collapsible automobile accessory mount of claim 5, wherein the accessory is selected from a group comprising a flag, banner, light, loudspeaker, camera, table or a basket.

7. The collapsible automobile accessory mount of claim 1, wherein the accessory attachment point is configured to releasably attach at least two accessories.

8. A tire-mounted accessory system comprising:
an automobile tire;
a collapsible automobile accessory mount, said collapsible automobile accessory mount comprising a central bracket, first arm having a proximal end and a distal end, said first arm rotatably attached to the central bracket at the proximal end, and having a first tire connector rotatably attached to the distal end;
a second arm having a proximal end and a distal end, said first arm rotatably attached to the central bracket at the proximal end, and having a second tire connector rotatably attached to the distal end;
a third arm having a proximal end and a distal end, said third arm rotatably attached to the central bracket at the proximal end;
an accessory attachment point on the outer surface of the central bracket;
wherein the collapsible automobile accessory mount is releasably attached to the automobile tire at the first tire connector and the second tire connector.

9. The tire-mounted accessory system of claim 8, wherein the lengths of the first arm, second arm and third arm are extensible by between 1 and 10 inches.

10. The tire-mounted accessory system of claim 8, wherein the first arm further includes a ball catch configured to fix the first arm's position at or between the deployed position and the non-deployed position.

11. The tire-mounted accessory system of claim 8, wherein the central bracket further comprises a plurality of stops configured to releasably fix the rotation of the first arm, the second arm, and the third arm in a preset position.

12. The tire-mounted accessory system of claim 8, wherein the accessory attachment point further includes an accessory attachment point connector for releasably attaching an accessory.

13. The tire-mounted accessory system of claim 12, wherein the accessory is selected from a group comprising a flag, banner, light, loudspeaker, camera, table, or a basket.

14. A method of attaching a collapsible automobile accessory mount to an automobile tire comprising:
providing a collapsible automobile accessory mount including a central bracket having an inner surface and an outer surface, a first arm having a proximal end and a distal end, said first arm rotatably attached to the central bracket at the proximal end and having a first tire connector rotatably attached to the distal end; a second arm having a proximal end and a distal end, said second arm rotatably attached to the central bracket at the proximal end and having a second tire connector rotatably attached to the distal end; a third arm having a proximal end and a distal end, said third arm rotatably attached to the central bracket at the proximal end; an accessory mounting point disposed on the outer surface of the central bracket; wherein the first arm, second arm and third arm are rotatable between a deployed position and a not deployed position;
placing the first arm, second arm and third arm in the deployed position by rotating said arms about the central bracket;
placing collapsible automobile accessory mount on an automobile tire;
securing the collapsible automobile accessory mount to the automobile tire at the first tire connector and second tire connector.

15. The method claim 14, wherein the lengths of the first arm, second arm and third arm are extensible by between 1 and 10 inches.

16. The method claim 14, wherein the collapsible automobile accessory mount further includes a third tire connector at the distal end of the third arm, and the method further comprises the step of securing the collapsible automobile accessory mount to the automobile tire at the third tire connector.

17. The method claim 14, wherein the central bracket further includes a plurality of stops configured to releasably fix the rotation of the first arm, the second arm, and the third arm in a preset position.

18. The method claim 14, wherein the accessory attachment point further includes an accessory attachment point connector for releasably attaching an accessory.

19. The method claim 14, wherein the accessory is selected from a group comprising a flag, banner, light, loudspeaker, camera, table or a basket.

20. The method claim 14, wherein the accessory attachment point is configured to releasably attach at least two accessories.

\* \* \* \* \*